L. A. YOUNG.
DENTAL DISK AND HOLDER.
APPLICATION FILED JAN. 19, 1918.

1,277,020.

Patented Aug. 27, 1918.

Inventor.
Luther A. Young
By John C. Higdon
His Attorney.

UNITED STATES PATENT OFFICE.

LUTHER A. YOUNG, OF ST. LOUIS, MISSOURI.

DENTAL DISK AND HOLDER.

1,277,020.

Specification of Letters Patent.

Patented Aug. 27, 1918.

Application filed January 19, 1918. Serial No. 212,830.

*To all whom it may concern:*

Be it known that I, LUTHER A. YOUNG, a citizen of the United States, residing at St. Louis, in the State of Missouri, have invented certain new and useful Improvements in Dental Disks and Holders, of which the following is a specification containing a full, clear, and exact description, reference being had to the accompanying drawings, forming a part hereof.

My invention relates to an improved dental disk and holder, and it consists in the novel construction hereinafter fully described and particularly claimed.

Heretofore much difficulty has been experienced by the manufacturers of rubber polishers used by dentists, inasmuch as the threaded shank of the screw had not been properly protected from the plastic uncured rubber, during the vulcanizing process, with the deplorable and expensive result that the uncured rubber has leaked out of the mold at the base of the screw-head, and has run out of the mold into contact with the threads of the screw, and produced a coating of vulcanized rubber upon said threads, which has been difficult and expensive to remove, but which had to be removed in order to make the polishers marketable and useful.

The object of my invention is to provide an improved dental disk and holder in which the threads of the screw cannot become coated with rubber during the vulcanizing process, but are protected from the plastic uncured rubber by a sort of a "check valve," which forms an integral part of the screw itself and fits so closely to the mold as to effectually prevent any escape of rubber past the head of the screw onto the threads thereof; whereby a screw with clean and unobstructed threads will be produced, and enabling the finished polisher to be marketed and used without the former cleaning of the rubber from the threads.

The numeral 1 designates the rubber body of the polisher, which is molded and vulcanized in the usual manner, in various shapes and forms, except as to the manner of preventing the rubber from contaminating or covering the threads of the screw.

My improved screw has the usual head 3 and threaded shank 2, by means of which the polisher is held in the mandrel during use; the threads on said shank extending continuously from the free end of said shank to the base of said head, but the base of the head 3 is so constructed and arranged in the mold that it acts as a "check-valve" to prevent any rubber from passing out of the mold onto said threads.

Figure 1:
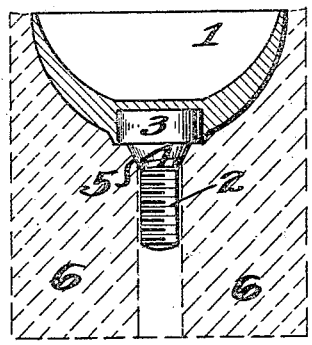
Figure 1 is a vertical section of my improved dental polisher screw located in the female mold, with the rubber body of the polisher also in the said mold, all enlarged for clear illustration.
Figure 2:
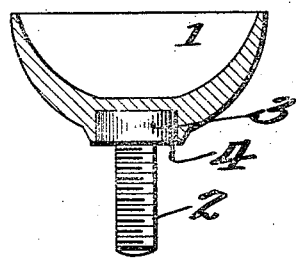
Fig. 2 is a vertical section of a dental polisher (enlarged) having my improved screw vulcanized therein, ready for use.
Figure 4:
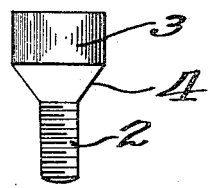
Fig. 4 is an elevation of the screw (enlarged) in a still further modified form.
Figure 3:
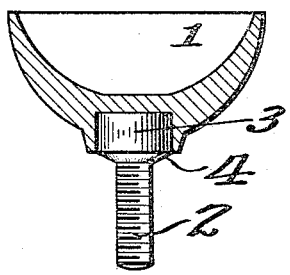
Fig. 3 is a view similar to the last, with the head of the screw slightly modified.
Figure 5:
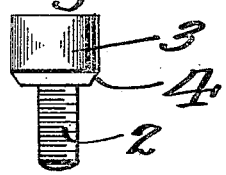
Fig. 5 is a view similar to the last, with the head of the screw still further modified.

At the base of the head 3 is a clean base-surface 4, which may be conical as shown in Figs. 1, 3, 4 and 5, or flat as shown in Fig. 2, and which closely fits a correspondingly-shaped seat 5 of the female mold 6, and prevents the passage of rubber past the head of said screw and onto said threads of the latter, so that the polisher is turned out of the molds with the said base-surface 4 perfectly clean, and devoid of rubber, as are also the threads of the screw.

I claim:

1. An improved dental disk, composed of a body of rubber of the desired shape, and a metallic holder having its head covered by the rubber, except at the base of its head, which is clean and uncovered, as is also the shank of said holder.

2. An improved dental disk and holder, composed of a suitable body of rubber of the desired shape to form a disk, and a headed screw the head whereof is covered by said rubber except at the base of said head, which is clean and uncovered to form an exposed seat which fits a correspondingly-shaped part of the vulcanizing-mold, and acts as a valve to prevent passage of rubber from the mold onto the threaded shank of said screw.

In testimony whereof, I have signed my name to this specification in presence of two subscribing witnesses.

LUTHER A. YOUNG.

Witnesses:
FRANCES HOOVER ROSENBAUM,
JOHN C. HIGDON.

Copies of this patent may be obtained for five cents each, by addressing the "Commissioner of Patents, Washington, D. C."